United States Patent
Mikkelsen et al.

(10) Patent No.: US 6,826,511 B2
(45) Date of Patent: Nov. 30, 2004

(54) METHOD AND APPARATUS FOR THE DETERMINATION OF LAYER THICKNESSES

(75) Inventors: Hakon Mikkelsen, Göttingen (DE); Horst Engel, Giessen (DE); Joachim Wienecke, Jena (DE)

(73) Assignee: Leica Microsystems Jena GmbH, Jena (DE)

( * ) Notice: Subject to any disclaimer, the term of this patent is extended or adjusted under 35 U.S.C. 154(b) by 6 days.

(21) Appl. No.: 10/360,965

(22) Filed: Feb. 7, 2003

(65) Prior Publication Data

US 2003/0147085 A1 Aug. 7, 2003

(30) Foreign Application Priority Data

Feb. 7, 2002 (DE) .......................... 102 04 943

(51) Int. Cl.⁷ .................... G06F 15/00; G01B 11/02
(52) U.S. Cl. .................. 702/172; 702/159; 702/170; 356/504
(58) Field of Search .................... 702/127, 134, 702/159, 170, 172; 250/559.26, 559.27, 372; 356/504, 600, 632

(56) References Cited

U.S. PATENT DOCUMENTS

| | | |
|---|---|---|
| 4,984,141 A | 1/1991 | Kondo |
| 5,440,141 A | 8/1995 | Horie |
| 5,493,401 A | 2/1996 | Horie et al. |
| 5,724,145 A * | 3/1998 | Kondo et al. ............... 356/632 |
| 6,361,646 B1 * | 3/2002 | Bibby et al. .................. 216/85 |

FOREIGN PATENT DOCUMENTS

DE      10021379 A1     5/2000

OTHER PUBLICATIONS

O. Stenzel, "Das Dunnschichtspektrum" [The thin–layer spectrum], Akademieverlag 1996, pp. 77–80.

Hauge, P.S., "Polycrystalline silicon firm thickness measurement from anaylsis of visible reflectance spectra". J. Opt. Soc. Am., vol. 69 (8), 1979, pp. 1143–1152.

* cited by examiner

Primary Examiner—Bryan Bui
(74) Attorney, Agent, or Firm—Simpson & Simpson, PLLC

(57) ABSTRACT

A method and apparatus for determination of layer thicknesses and optical parameters of a number of layers of a specimen, in which the reflectance spectrum of the specimen is measured and then smoothed, and a modeled reflectance spectrum is adapted to the measured one by means of an optimization criterion so as thereby to determine the layer thickness. The optimization criterion is determined by the totality of the absolute values of the wavelength differences of all pairs of wavelengths, a pair of wavelengths being constituted by those wavelengths that respectively correspond to a selected extreme in the measured reflectance spectrum characterized by an index counting the extremes in ascending or descending order, and a selected extreme in the modeled reflectance spectrum having the same index.

6 Claims, 3 Drawing Sheets

METHOD AND APPARATUS FOR THE DETERMINATION OF LAYER THICKNESSES

CROSS REFERENCE TO RELATED APPLICATIONS

This application claims priority of the German Patent Application No. 102 04 943.2, filed Feb. 7, 2002, which is incorporated by reference herein.

FIELD OF THE INVENTION

The invention concerns a method for the determination of layer thicknesses and optical parameters of a number of layers of a specimen, in which the reflectance spectrum of the specimen is measured and subsequently smoothed, and a modeled reflectance spectrum is adapted to the measured one so as thereby to determine the layer thicknesses; and refers to the problem of determining the thicknesses of multiple-layer systems.

BACKGROUND OF THE INVENTION

Reflection spectrometry is a method, widely used and known for some time, for the examination of layered systems, in particular wafers, and for the determination of layer thicknesses and other optical parameters. The principle of the method is very simple: a specimen that has multiple layers is irradiated with light of a defined wavelength. If the layers are transparent, the light penetrates into the media and is partially reflected in the transition regions between two layers, including the transition between the topmost layer and the ambient atmosphere. The superimposition of incident and reflected light results in interferences, thus influencing the intensity of the reflected light. The ratio between the intensities of the incident and the reflected light determines the so-called absolute reflectance; both intensities must therefore be measured. If the wavelength is then varied continuously within a defined range, this yields a reflectance spectrum that, as a function of the wavelength, has maxima and minima that are produced by the interferences. The locations of these extremes depend on the material properties of the specimen, which determine the optical behavior. These optical parameters include, for example, the refractive index and absorption coefficient. The layer thickness additionally influences the location of the extremes in the reflectance spectrum.

It is possible, in principle, to deduce these parameters from the measured reflectance spectrum; in an ideal model, the limits in terms of the thickness and number of layers are very wide. The basic formulae can be derived from Fresnel refraction theory, as described in detail in the article "Polycrystalline silicon film thickness measurement from analysis of visible reflectance spectra" by P. S. Hauge in J. Opt. Soc. Am., Vol. 69 (8), 1979, pp. 1143–1152. As is evident from the book by O. Stenzel, "Das Dünnschichtspektrum" [The thin-layer spectrum], Akademieverlag 1996, pp. 77–80, the determination of optical constants and layer thicknesses by back-calculation in reality turns out to be very difficult and laborious, however, since the number of unknowns is very large.

One must therefore resort to approximations, or apply limitations. Thickness determination is simplest if the number of layers is limited to one layer whose thickness is to be determined. In this case a correlation can be created between the layer thickness d and the refractive indices $n(\lambda_i)$ for the wavelengths $\lambda_i$ that belong to the extremes in the reflectance spectrum, where the index i indicates the extremes. If the reflectance spectrum contains a total number m of extremes between two arbitrarily selected extremes $\lambda_i$ and $\lambda_j$, the layer thickness can then be determined using the equation $$d = \frac{1}{4} \cdot \frac{m-1}{\frac{n(\lambda_i)}{\lambda_i} - \frac{n(\lambda_j)}{\lambda_j}} \tag{1}$$

To arrive at this expression, however, the limiting assumption of only one weakly dispersive layer must be applied; this formula fails with strong dispersion and with absorbent layers. This limits the class of materials that can be investigated. A further prerequisite is that the wavelength-dependent refractive index $n(\lambda)$ be known. This principle, hereinafter called the "extremes method," is the basis of, for example, the method described in U.S. Pat. No. 4,984,894 for determining the layer thickness of a layer.

U.S. Pat. No. 5,440,141 describes a method for determining the thicknesses of three layers. In this, an approximate thickness of the first layer is determined using the aforementioned "extremes method." The exact thickness of the first layer is then determined by calculating, in a region approximately ±100 nm around this value and for various thicknesses, firstly a modeled reflectance spectrum and secondly the deviations of the respective modeled reflectance spectrum from the measured spectrum. These deviations are combined into an error function E min which the deviations are squared:

$$E \sim \sum_{\lambda_i} w_{\lambda_i} (R^{ex}(\lambda_i) - R^{th}(\lambda_i))^2. \tag{2}$$

where $w_\lambda$ is a weighting factor, $R^{ex}$ the experimentally determined reflectance spectrum, and $R^{th}$ the modeled reflectance spectrum for a layer thickness. This layer-thickness-dependent function E is then minimized by looking for the modeled reflectance spectrum at which the deviations are smallest. The layer thickness at which the function E is minimal is identified as the actual layer thickness. With multiple layers, however, this method can be implemented only if the first layer reflects in a first wavelength region in which the lower layers absorb light, so that they can be left out of consideration when determining the thickness of the first layer. In the document cited, reflection measurements are therefore performed in two different wavelength regions.

To determine an approximate thickness of the second layer, a frequency analysis of the reflectance spectrum in the second wavelength region is performed, based on the fact that maxima and minima repeat periodically in the reflectance spectrum; this is expressed in the converted spectrum by the presence of more or less pronounced peaks. These peaks allow an initial approximate conclusion as to the thickness of the second layer. An approximate thickness of the third layer is obtained by lowpass filtration, the differing material properties of the layer stack once again being exploited here. Similarly to the procedure for the first layer, an error function dependent on the thicknesses of the second and third layers is minimized, by looking for those thicknesses at which the deviations between the experimental and modeled spectra are smallest.

It is thus clearly evident from U.S. Pat. No. 5,440,141 that the thicknesses of multiple layers can be determined, but that this works only for layer combinations of specific materials.

Lastly, U.S. Pat. No. 5,493,401 describes a method for determination of the thicknesses of—in principle—an arbitrarily large number of layers. This is done by first determining the total number of extremes as well as the smallest and largest wavelength that corresponds to one extreme. From these magnitudes, conclusions can be drawn as to the total thickness of the layer stack, i.e. the summed thicknesses of the individual layers. For each of the various combinations of individual thicknesses that together yield the total thickness, a modeled reflectance spectrum is then calculated and an error function E, containing the deviations between the modeled and the experimental reflectance spectrum, is determined as described above. That combination of thicknesses for which those deviations are smallest is then found.

The applicability of the method described in U.S. Pat. No. 5,493,401 is also limited, however. As soon as the experimental spectrum is more greatly modified by influences that the model does not, or does not adequately, account for, the results are no longer reliable, and what is obtained is very probably an incorrect set of layer thicknesses for which the function E assumes a local minimum. Light scattering, such as occurs e.g. in polysilicon, and specimen surface roughness influence e.g. the expression of the extremes: at high levels of roughness and diffusion, certain extremes will be less pronounced, i.e. will have lower reflectance, than actually predicted in the model. Insufficient spectral resolution of the spectrometer can also cause changes. The materials also must be known, since both the refractive indices and the absorption constants must be defined. Severe dispersion or absorption also acts to modify the expression of the extremes. Deviations can therefore occur between the modeled and experimental reflectance spectra, especially in the UV region where absorption is high; the method described in U.S. Pat. No. 5,493,401 is therefore also preferably used at wavelengths in the range from 400 to 800 nm. These factors that can modify the experimental reflectance spectrum are not taken into account, or are considered only insufficiently, in all the theoretical models on which the various evaluation models are based. The greater the deviations between the modeled and measured reflectance spectra, the greater the uncertainty in the search for a minimum for the error function, i.e. in the determination of the optimum layer thicknesses; and in some circumstances that search is entirely unsuccessful. One of the results has been that depending on the specimen system, a particular adapted model is used that yields acceptable results for specific material combinations but fails with other specimen systems.

SUMMARY OF THE INVENTION

Proceeding from this existing art, it is the object of the invention to develop a method with which the optical parameters and thicknesses of multiple-layer systems can be determined more reliably than heretofore, and which reacts less sensitively to interfering factors that influence the reflectance spectrum.

According to the present invention, in a method of the kind described above encompassing, in a first step, introducing a specimen, having a number N of layers whose thicknesses are to be determined, into a measurement arrangement and measuring the reflectance spectrum of the specimen in a defined wavelength region; in a second step, smoothing the measured reflectance spectrum by a reduction equivalent to noise caused predominantly by external influences; in a third step, selecting a set $S_1$ of a number M of wavelengths $\lambda_{1,i}$, where i=1, ..., M, arranged in order of size, each wavelength $\lambda_{1,i}$ in the set $S_1$ corresponding to a respective local extreme in the smoothed reflectance spectrum and the selection being performed under the condition that two adjacent extremes differ by at least one defined contrast criterion, and that one of the two extremes is a minimum and the other a maximum; in a fourth step, adapting a modeled reflectance spectrum in stepwise fashion to the smoothed reflectance spectrum for the number N of layers, using a model, in which layer thicknesses, or layer thicknesses and optical parameters, are defined as variable magnitudes, in each adaptation step a set $S_2$ of a number M of wavelengths $\lambda_{2,j}$, where j=1, ..., M, arranged in order in the same fashion as in the set $S_1$, being selected, each wavelength $\lambda_{2,j}$ in the set $S_2$ corresponding respectively to a local extreme in the modeled reflectance spectrum, and the selection being performed under the condition that of two adjacent extremes, the one is a minimum and the other a maximum, and in each adaptation step an optimization criterion furthermore being determined, the best adaptation corresponding to a minimum of the optimization criterion so that the actual layer thickness can substantially be determined, the object is achieved in that the optimization criterion is determined by the totality of the absolute values of the wavelength differences of all pairs of wavelengths $(\lambda_{1,i}, \lambda_{2,i})$, where i=1, ..., M.

The new method is based on the astonishing realization that adapting the positions of the extremes in the model to the positions of the extremes in the experimental spectrum is sufficient to allow an accurate layer thickness determination to be made. The totality of the differences in the pairs of wavelengths is the decisive criterion here. To prevent positive and negative differences from possibly canceling one another out and yielding an incorrect set of layer thicknesses, the absolute values are considered.

It is preferable to consider the sum of the squares of the differences, since if optimization is to take place with the aid of a calculation system, fewer calculation operations are necessary in this case than if the absolute value is considered. Other functions in which the differences between respective pairs of wavelengths participate as absolute values are also conceivable, however, e.g. polynomial functions.

With a large number of extremes and a large number of specimens to be examined, it is additionally advantageous to weight the sum with the number M of extremes; this can then be employed simultaneously to assess the quality of the adaptation for various specimens.

Because only the wavelengths and not (as with the methods used previously) the reflectance spectra are compared in the method according to the present invention, the new method is less dependent on interfering influences, The result is therefore not influenced by whether and how reflectances are damped, provided they can be measured and are present in the smoothed reflectance spectrum. Even wavelengths at which the absorptivity of the specimen is so high that the extremes are greatly damped—but still recordable—can be used for investigation. Materials for which investigation with existing methods was difficult or impossible are also easily accessible to the method according to the present invention, for example polysilicon, which exhibits a high level of light scattering because of the many different crystal directions. Thick layers can also easily be analyzed. Layers up to 50 $\mu$m in thickness can be investigated with the new method. In principle, even systems with many layers are accessible to the method, although adaptation with more than seven layers is very time-consuming if current standard home computers are used for evaluation and adaptation.

A further advantage of the method is the fact that optical parameters can also be determined, i.e. that layered systems made of unknown materials can also be investigated.

BRIEF DESCRIPTION OF THE DRAWINGS

The invention will be explained below with reference to an exemplary embodiment. In the accompanying drawings.

DETAILED DESCRIPTION OF THE INVENTION

Figure 1:
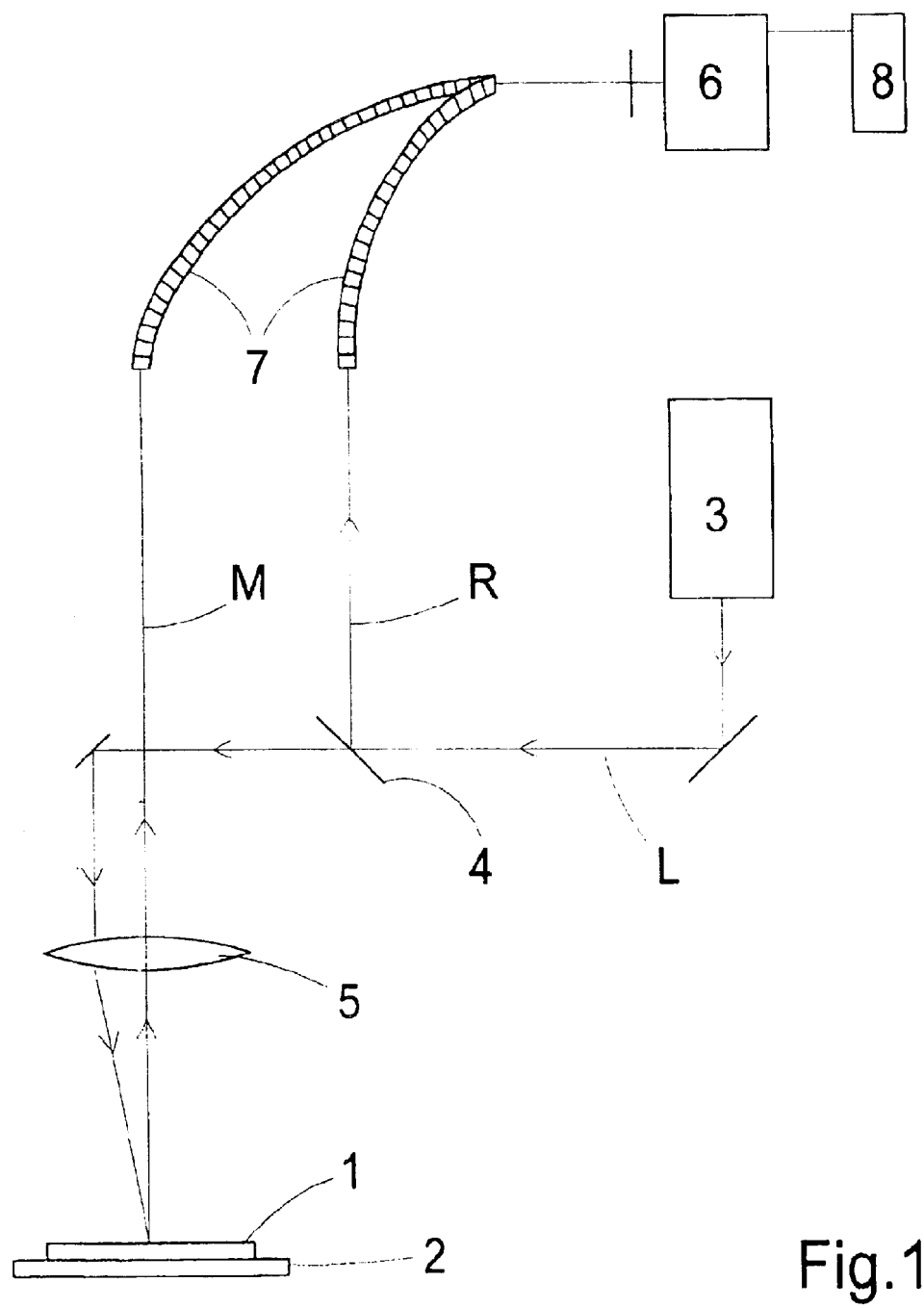
FIG. 1 shows the general configuration of a measurement arrangement with specimen.

FIG. 1 shows one possible arrangement that can be used in principle for layer thickness determination and is described in the existing art, e.g. in the document DE 100 21 379 A1. A specimen 1, for example a wafer, is introduced into the measurement system. In FIG. 1, the specimen is secured in a mount 2. A light beam L, which is split by a beam splitter 4 into a reference beam R and a measured beam M, proceeds from a light source 3. Specimen 1 is illuminated with measured beam M via an objective 5, the arrows and lines being intended to illustrate the light path. A white-light source, for example, can serve as light source 3, but coherent light sources such as tunable-wavelength lasers are also conceivable. Light sources which emit wavelengths in the optical region that cannot be directly recorded by the eye are also included. By means of beam splitter 4 it is possible to record, in a receiving unit 6, on the one hand the direct signal of the light source and on the other hand the light reflected from specimen 1. Incoupling of reference light beam R and measured light beam M into receiving unit 6 can be accomplished, for example, with light-guiding devices 7. The light is spectrally dispersed in receiving unit 6 (if multiple wavelengths proceed simultaneously from light source 3), and the intensities of the directly incident light and reflected light are recorded for each measured wavelength. Receiving unit 6 is connected to an evaluation unit 8 which can be, for example, a commercially available home computer.

Figure 2:
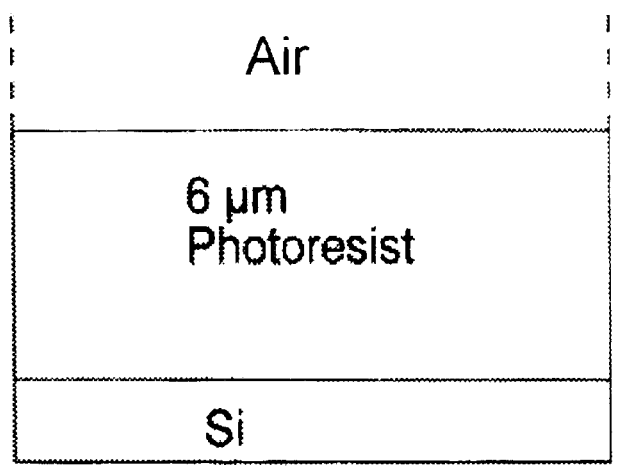
FIG. 2 shows a model of a specimen.

The specimen can be, for example, a layered system such as the one sketched in FIG. 2. A light-insensitive surface layer or so-called photoresist layer, whose thickness according to the manufacturer is intended to be 6 $\mu$m, is applied on a silicon substrate. With this method, the materials of which this layer is composed play no part; in particular, the optical material properties therefore need not necessarily be known. Air is present above the photoresist layer.

After the introduction of specimen 1 into the measurement arrangement, the reflectance spectrum is measured in a previously defined wavelength region. The wavelength region can be limited to the region directly perceptible to the eye, but depending on the material system being investigated it may also be necessary to consider shorter or longer wavelengths as well.

Figure 3:
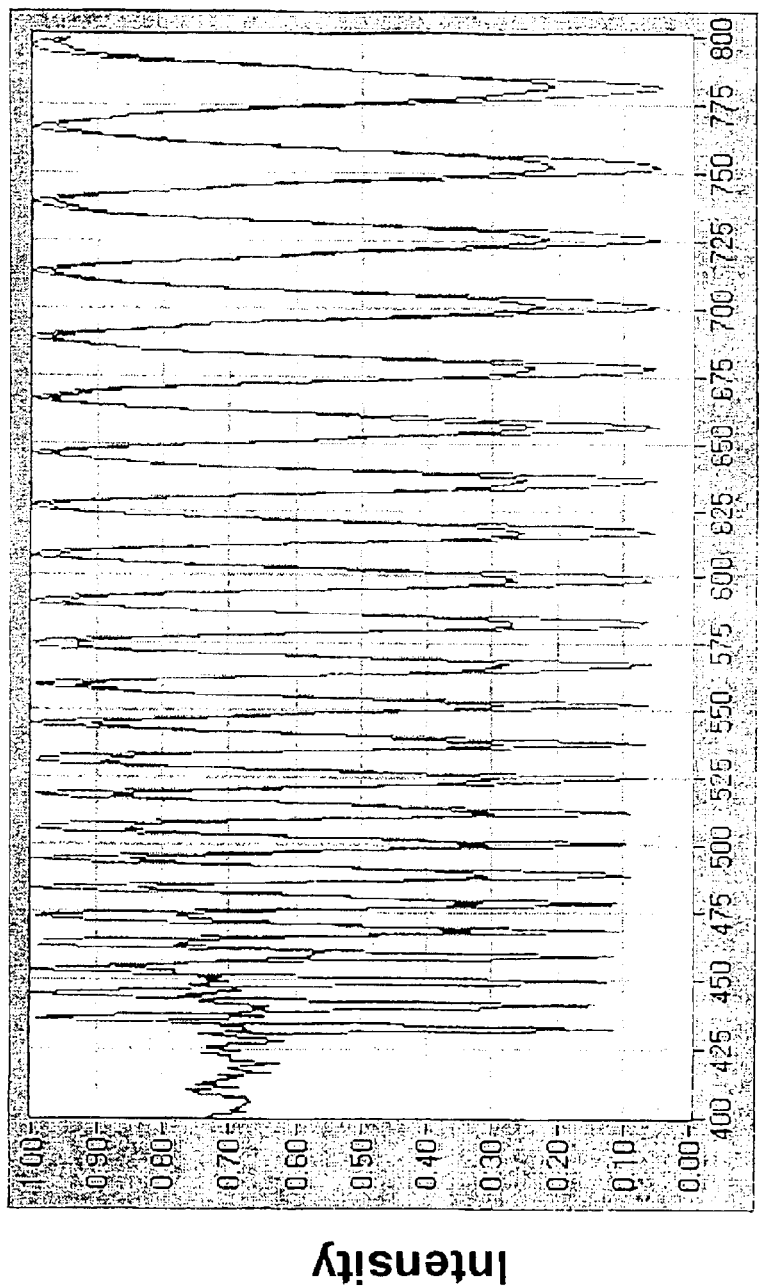
FIG. 3 shows a measured and modeled reflectance spectrum for a specimen as depicted in FIG. 2.

The reflectance spectrum measured with a specimen shown in FIG. 2 is depicted in FIG. 3 as a black line. The spectrum is quite noisy, especially in the wavelength region between 400 and 470 nm; this is attributable to the measurement device. Using a smoothing method, the measured reflectance spectrum is smoothed, i.e. it is reduced by an amount equal to the noise caused by external influences. One common smoothing method that can be used here is, for example, convolution of the reflectance spectrum using a Gaussian function; another method, for example, is the floating average method. It is important to ensure, however, that the oscillations in the system that exhibit the steepest increases or decreases, and are caused by the thickest layers in the layered system, are not so strongly damped that they are discarded in the next step of the method because they differ, after smoothing, by an amount less than a contrast criterion. The smoothing method allows even the highly noisy region between 430 and 470 nm to be utilized for spectral analysis.

A set $S_1$ of a number M of wavelengths $\lambda_{1,i}$, where i=1, . . . , M, is then selected from the smooth reflectance spectrum. The selection begins at one end of the spectrum, e.g. at the long-wavelength end of the acquired spectrum, and ends at the other end of the spectrum, so that the selected wavelengths $\lambda_{1,i}$ are arranged in order of size. Three conditions must be met for selection of a wavelength $\lambda_{1,i}$: (i) the wavelength $\lambda_{1,i}$ must correspond to a local extreme in the smoothed reflectance spectrum; (ii) two adjacent extremes must differ by an amount at least equal to a defined contrast criterion; and (iii) for two adjacent extremes, one must be a minimum and the other a maximum. The effect of stipulating a contrast criterion is that noise still present after smoothing is further reduced, and that extremes not resulting from the layered structure are rejected. The contrast criterion corresponds to a minimum difference in reflectance for each two adjacent extremes, corresponding to the condition in (iii) above, which must be exceeded so that the smaller of the two wavelengths is selected (assuming that wavelength selection begins at the long-wavelength end of the spectrum). The contrast criterion imposed can be, for example, that the extremes must differ by at least 4% of the maximum value in the reflectance spectrum.

In order to determine the layer thicknesses and other optical parameters, a model with which a reflectance spectrum can be calculated must be established. The technical literature offers a number of models in this context, some of which—like the methods mentioned at the outset—require that indices of refraction and absorption be known. In the method according to the present invention, however, it is possible also to use, in particular, those methods in which not only the layer thicknesses but also optical parameters, such as the indices of refraction and absorption, participate as variable magnitudes.

Using such a model, it is then possible, for a defined number N of layers, to model a reflectance spectrum and adapt it in stepwise fashion to the smoothed reflectance spectrum. This can be done, for example, in evaluation unit 8, in which a reflectance spectrum is modeled for various combinations of parameters that participate as variable magnitudes.

For each modeled reflectance spectrum, by analogy with the measured and smoothed reflectance spectrum, a set $S_2$ of a number M of wavelengths $\lambda_{2,j}$, where i=1, . . . , M, is then selected. Selection begins at the same end of the spectrum at which selection for the set $S_1$ began, so that the selected wavelengths $\lambda_{2,j}$ are arranged in order of size in the same manner as set $S_1$. Selection is once again performed under the condition that of two adjacent extremes, one is a minimum and the other a maximum.

A set $S_2$ thus contains exactly as many wavelengths as set $S_1$, and two wavelengths $\lambda_{1,i}$ and $\lambda_{2,i}$ having the same index i correspond to one another in that they each designate the extremes in the smoothed and modeled reflectance spectra that are regarded as belonging to the same reflections. An optimization criterion is determined for each modeled reflectance spectrum. The best adaptation is achieved when the optimization criterion assumes a minimum. According to the present invention, the optimization criterion can be represented e.g. by the following function:

$$Q_{opt} = \frac{1}{M}\sum_{i=1}^{M}[\lambda_{1,i}(\{P_j\}) - \lambda_{2,i}(\{P_j\})]^2 \quad (3)$$

where $Q_{opt}$ indicates the optimization criterion and $\{P_j\}$ represents the set of parameters that participate in the model of the reflectance spectrum as variable magnitudes, and the serial index j assumes all values between 1 and the maximum number of parameters participating. The participants in the optimization criterion are therefore the differences between pairs $(\lambda_{1,i}, \lambda_{2,i})$ of wavelengths that respectively correspond to one another.

There are many different possibilities for determining the minimum of the optimization criterion, two of which will be mentioned here by way of example in order to illustrate the discovery process.

The first possibility is to start by establishing a definition range for each parameter that participates as a variable magnitude in the model of the reflectance spectrum; in other words, each parameter can lie between a defined minimum and maximum value. Between these limits a number of values are defined, at approximately equal spacings from one another, for each parameter. This yields a number of combinations of parameters; in each adaptation step and for each of these combinations, a reflectance spectrum is modeled, the optimization criterion is determined, and the combination of parameters that previously yielded the minimum is compared to the optimization criterion. If it yields a lower value, the previous combination is discarded and the optimization criterion calculated in that step is defined as the new minimum.

The combination of parameters that results in the new minimum is stored as an optimum combination of parameters, for example in a memory that can be located in evaluation unit 8. Because, in the first adaptation step, an optimization criterion is not yet available from a previous step, it is advisable simply to allocate a very large value, e.g. $10^{20}$, to the optimization criterion. The result of the first adaptation step usually immediately falls below this value.

It is thereby possible to identify, from all the possible parameter combinations, the one whose optimization criterion is minimal with respect to the others, and which therefore comes closest to the actual parameters. Because a wide range of parameter combinations is examined, this method permits very reliable identification of the global minimum or at least the region in the vicinity of that minimum, with an accuracy corresponding approximately to the respective spacing between two examined values of a parameter.

As a second possibility, a more accurate determination of the minimum can be made using standardized mathematical algorithms, e.g. the conjugate gradient method. An essential prerequisite here, however, is to start with a parameter combination that is already quite close to the global minimum, since otherwise the risk exists of finding a local minimum. This method is moreover very time-intensive. For this reason, it is advisable firstly to narrow down the range in which the expected global minimum lies (which can be done, for example, with the method cited as the first possibility), and to use the combination of parameters identified in that process as the initial combination for the gradient method.

This combination of the two possibilities was used to determine the layer thickness of the photoresist layer of the system shown in FIG. 2. The variable magnitudes involved were the layer thickness of the photoresist layer and its refractive index. The reflectance spectrum whose optimization criterion yields a minimum is shown in FIG. 3 as gray line. A value of 6149 nm is obtained as the layer thickness. This once again clearly shows an advantage of the method according to the present invention, namely that optical parameters can also be determined.

Parts List

1 Specimen
2 Mount
3 Light source
4 Beam splitter
5 Objective
6 Receiving unit
7 Light guides
8 Evaluation unit
L Light beam
R Reference beam
M Measured beam

What is claimed is:

1. A method for the determination of layer thicknesses and optical parameters of a number (N) of layers of a specimen, the method comprising:

introducing the specimen into a measurement arrangement and measuring the reflectance spectrum of the specimen in a defined wavelength region;

smoothing the measured reflectance spectrum by a reduction equivalent to noise caused predominantly by external influences;

selecting a set ($S_1$) of a number (M) of wavelengths ($\lambda_{1,i}$), where i=1, . . . M, arranged in order of size, each wavelength ($\lambda_{1,i}$) in the set ($S_1$) corresponding to a respective local extreme in the smoothed reflectance spectrum, and the selection being performed under the condition that two adjacent extremes differ by at least one defined contrast criterion, and that one of the two extremes is a minimum and the other a maximum;

adapting a modeled reflectance spectrum in stepwise fashion to the smoothed reflectance spectrum for the number (N) of layers, using a model, in which layer thicknesses, or layer thicknesses and optical parameters, are defined as variable magnitudes, in each adaptation step selecting a set ($S_2$) of a number (M) of wavelengths ($\lambda_{2,j}$), where j=1, . . . M, arranged in order in the same fashion as in the set ($S_1$), each wavelength ($\lambda_{2,j}$) in the set ($S_2$) corresponding respectively to a local extreme in the modeled reflectance spectrum, and the selection being performed under the condition that of two adjacent extremes, the one is a minimum and the other a maximum;

determining an optimization criterion, the best adaptation corresponding to a minimum of the optimization criterion so that the actual layer thickness can substantially be determined; and determining the optimization criterion by the totality of the absolute values of the wavelength differences of all pairs of wavelengths ($\lambda_{1,i}, \lambda_{2,i}$), where i=1, . . . , M.

2. The method as defined in claim 1, wherein the optimization criterion is determined by the sum of the squared differences ($\lambda_{1,i}-\lambda_{2,i}$) of all pairs of wavelengths ($\lambda_{1,i}, \lambda_{2,i}$), where i=1, . . . , M.

3. The method as defined in claim 2, wherein the sum is weighted with the number (M).

4. A apparatus for the determination of layer thicknesses and optical parameters of a number (N) of layers of a specimen, the apparatus comprising:

means for introducing the specimen into a measurement arrangement and measuring the reflectance spectrum of the specimen in a defined wavelength region;

means for smoothing the measured reflectance spectrum by a reduction equivalent to noise caused predominantly by external influences;

means for selecting a set ($S_1$) of a number (M) of wavelengths ($\lambda_{1,i}$), where i=1, ..., M, arranged in order of size, each wavelength ($\lambda_{1,i}$) in the set ($S_1$) corresponding to a respective local extreme in the smoothed reflectance spectrum, and the selection being performed under the condition that two adjacent extremes differ by at least one defined contrast criterion, and that one of the two extremes is a minimum and the other a maximum;

means for adapting a modeled reflectance spectrum in stepwise fashion to the smoothed reflectance spectrum for the number (N) of layers, using a model, in which layer thicknesses, or layer thicknesses and optical parameters, are defined as variable magnitudes, in each adaptation step means for selecting a set ($S_2$) of a number (M) of wavelengths ($\lambda_{2,j}$), where j=1, ..., M, arranged in order in the same fashion as in the set ($S_1$), each wavelength ($\lambda_{2,j}$) in the set ($S_2$) corresponding respectively to a local extreme in the modeled reflectance spectrum, and the selection being performed under the condition that of two adjacent extremes, the one is a minimum and the other a maximum;

means for determining an optimization criterion, the best adaptation corresponding to a minimum of the optimization criterion so that the actual layer thickness can substantially be determined; and means for determining the optimization criterion by the totality of the absolute values of the wavelength differences of all pairs of wavelengths ($\lambda_{1,i}$, $\lambda_{2,i}$), where i=1, ..., M.

5. The apparatus as defined in claim 4, wherein the optimization criterion is determined by the sum of the squared differences ($\lambda_{1,i}-\lambda_{2,i}$) of all pairs of wavelengths ($\lambda_{1,i}$, $\lambda_{2,i}$), where i=1, ..., M.

6. The apparatus as defined in claim 5, wherein the sum is weighted with the number (M).

* * * * *